United States Patent [19]

Geller

[11] 4,361,827
[45] Nov. 30, 1982

[54] VEHICLE ALARM SYSTEM

[75] Inventor: David A. Geller, Chicago, Ill.

[73] Assignee: Wico Corporation, Niles, Ill.

[21] Appl. No.: 156,811

[22] Filed: Jun. 5, 1980

[51] Int. Cl.³ .............................................. G08B 13/16
[52] U.S. Cl. ...................................... 340/65; 340/566;
340/568
[58] Field of Search ................... 340/63, 65, 508, 540,
340/541, 545, 565, 566, 568; 200/61.49

[56] References Cited

U.S. PATENT DOCUMENTS

| 2,741,675 | 4/1956 | Chase et al. | 200/61.49 |
| 2,885,504 | 5/1959 | Yurtz | 200/61.49 |
| 3,160,868 | 12/1964 | Kowanda | 340/566 |
| 4,001,805 | 1/1977 | Golbe | 340/545 |
| 4,012,728 | 3/1977 | Fowler | 340/508 |
| 4,013,995 | 3/1977 | Adamo | 340/65 |
| 4,040,008 | 8/1977 | Sanabria | 340/65 |
| 4,103,285 | 7/1978 | Lloyd et al. | 340/65 |
| 4,151,507 | 4/1979 | Willis | 340/64 |
| 4,196,429 | 4/1980 | Davis | 340/65 |
| 4,220,831 | 9/1980 | Zink | 340/545 |

Primary Examiner—Alvin H. Waring
Attorney, Agent, or Firm—Dithmar, Stotland, Stratman & Levy

[57] ABSTRACT

Pick-up means convert mechanical vibrations into an electrical signal at a corresponding frequency. The pick-up means is attached to a portion of the vehicle, which is mechanically coupled to the hubcap or wheel cover. A circuit responds to the electrical signal to provide an operating signal to generate an alarm.

6 Claims, 3 Drawing Figures

TO ALARM GENERATOR 27
TO BATTERY 29

VEHICLE ALARM SYSTEM

BACKGROUND OF THE INVENTION

Much attention in recent years has been directed to apparatus which can be installed on one's vehicle to produce an alarm when it is being stolen or otherwise being subjected to unauthorized entry. On the other hand, little attention has been directed to devices which would sound an alarm when parts of the vehicle are being stolen. Hubcaps and wheel covers, for example, were relatively inexpensive and therefore not worthy of protection, but, in recent years, have become more elaborate and costlier. Some automobile owners are desirous of a device which would sound an alarm when their expensive hubcaps (this term includes wheel covers also) are being removed.

Such a device presents a particular problem since hubcaps are located on rapidly moving parts of the vehicle, rendering it impossible or at least impractical to mount sensors or the like on the hubcap or the wheel itself.

There have been vehicle alarm systems which respond to vibrations in the vehicle. The difficulty with sensing vibrations is that prior art devices have been unable satisfactorily to distinguish between vibrations which occur in normal use and those that occur when a part of the vehicle is being removed. A passing vehicle often created vibrations which would set off such prior alarm systems.

SUMMARY OF THE INVENTION

It is therefore an important object of the present invention to provide an improved vehicle alarm device which senses the unauthorized removal of parts of the vehicle such as hubcaps but will not be falsed by vibrations which normally occur such as are caused by passing vehicles.

In summary, there is provided a vehicle alarm system for providing an operating signal to operate an alarm generator when a predetermined part of the vehicle is being removed, the vehicle alarm system comprising pick-up means for converting mechanical vibrations into an electrical signal at a frequency corresponding to the frequency of the mechanical vibrations, means for attaching the pick-up means to a portion of the vehicle which is mechanically coupled to the predetermined part, and circuit means coupled to the pick-up means and being responsive to the electrical signal to provide an operating signal to operate the alarm generator.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purpose of facilitating an understanding of the invention, there is illustrated in the accompanying drawings, a preferred embodiment thereof, from an inspection of which, when considered in connection with the following description, the invention, its construction, and operation, and many of its advantages should be readily understood and appreciated.

DESCRIPTION OF THE PREFERRED EMBODIMENT

Figure 1:
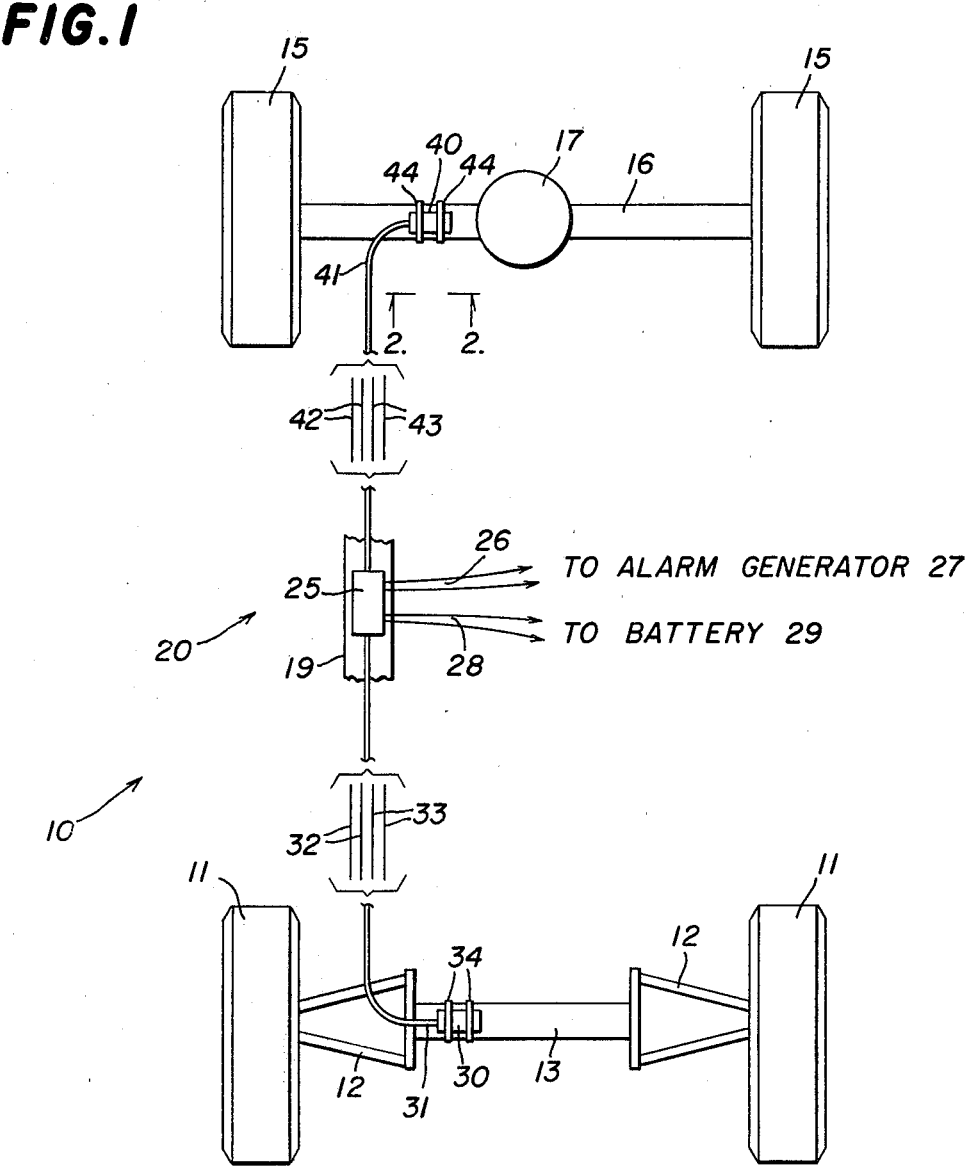
FIG. 1 is a view of the wheels and related parts of a vehicle with the device of the present invention schematically shown in relationship thereto.

Turning now to the drawings and more particularly to FIG. 1 thereof, there are shown portions of an automobile 10 depicted in plan view. The automobile 10 includes a pair of front tires 11 which are carried by wheels (not shown). Each of the wheels associated with the front tires is pivotally attached in the usual way to a pair of A-frame members 12 (only one is shown on each side). The four members 12 are in turn attached to a transverse frame member 13 that is part of the main auto frame. The rear tires 15 are carried by wheels (not shown) which are mounted on the rear axle (not shown) located in an axle housing 16. The usual differential 17 is also provided.

The wheels carrying the tires 11 and 15 have associated therewith hubcaps to conceal the mounting nuts, bolts, etc. These hubcaps are normally snap fitted onto the wheels and can be removed by use of a lever.

Figure 3:
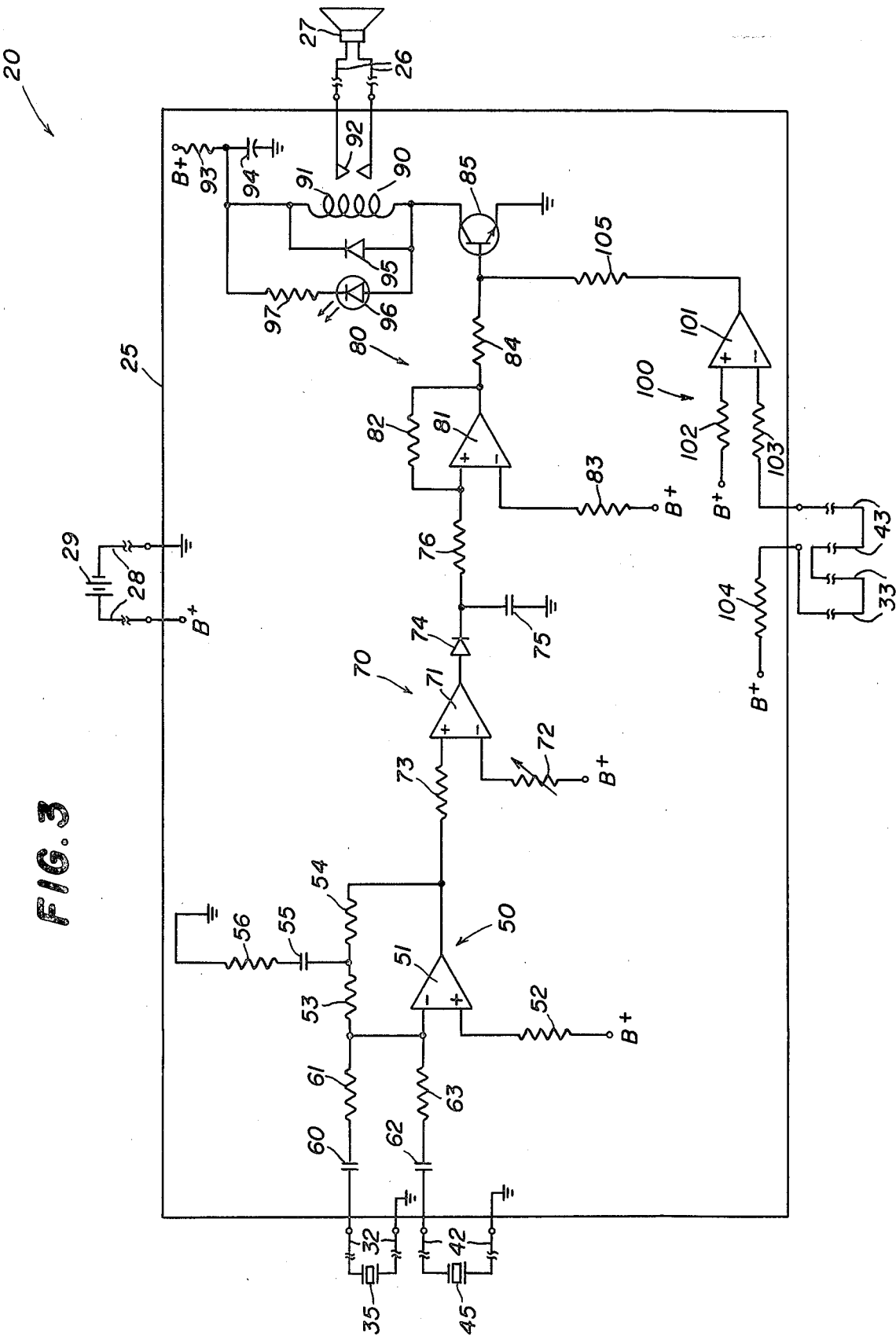
FIG. 3 is a circuit diagram of the vehicle alarm system.

The present invention comprises a vehicle alarm system 20 which generates an audible alarm to occur when any of the hubcaps is being removed. The vehicle alarm system 20 basically responds only to the screeching noise and resultant high-frequency sounds that are generated during removal of a hubcap. The vehicle alarm system 20 includes a main circuit 25 mounted on a member 19 of the main auto frame. The main circuit 25 is connected by wires 26 to an alarm generator 27 (FIG. 3) and by wires 28 to a battery 29 (FIG. 3). In a preferred form of the invention, the alarm generator 27 is a siren or the like which is part of another device that signals an unauthorized entry. In other words, one who purchases the vehicle alarm system 20 is likely to have or to purchase at the same time a device that sounds an alarm in the event of an unauthorized entry for some preset time such as 45 seconds. The siren in that device can be used as the alarm generator 27. Alternatively, a separate alarm generator can be used. Preferably the battery 29 is the vehicle battery. However, a separate supply may be used instead.

The vehicle alarm system 20 further comprises a pick-up unit 30 attached, by means of a cable 31 having two pairs of wires 32 and 33, to the main circuit 25. The pick-up unit 30 is attached to the transverse frame member 13 by any suitable means, such as by straps 34. High frequency vibrations of the transverse frame member 13 occurring when a hubcap associated with either tire 11 is removed are converted into electrical signals by a transducer 35 (FIG. 3) in the pick-up unit 30 and coupled by wires 32 to the main circuit 25. The wires 33 are part of a safety circuit to prevent tampering. If a thief cuts the cable 31 to disconnect the pick-up unit 30 from the main circuit 25, he will not only cut the wires 32 but also the wires 33. Severing of the wires 33 will automatically cause the alarm generator 27 to generate an alarm.

The vehicle alarm system 20 further comprises a second pick-up unit 40 connected by means of cable 41 to the main circuit 25. The cable 41 has two pairs of wires 42 and 43, the wires 42 being connected to conduct electrical signals and the pair of wires 43 being part of the safety circuit that causes an alarm to be generated if the cable 41 is severed. High frequency vibrations of the axle housing 16 occurring when a hubcap associated with either tire 15 is removed are converted into electrical signals by a transducer 45 (FIG. 3) in the pick-up unit 40.

The pick-up unit 30 being mounted on the transverse frame member 13 and the pick-up unit 40 being mounted on the axle housing 16 are merely exemplary. The pick-up units must be attached to a portion of the automobile 10 which is mechanically coupled to the parts which are to be protected, here the hubcaps.

Figure 2:
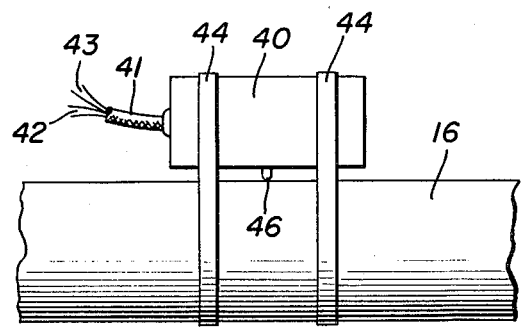
FIG. 2 is an elevation view on an enlarged scale of one of the pick-up means mounted on the vehicle.

Referring to FIG. 2, the pick-up unit 40 includes a stylus 46 which is in contact with the surface of the axle housing 16. The straps 44 insure that such contact is maintained. As will be explained, the stylus 46 is connected to a transducer 45 (FIG. 3) which converts mechanical vibrations (coupled thereto by the stylus 46) to electrical signals which are coupled through the wires 42 of the cable 41 to the main circuit 25. The pick-up unit 40 is basically the same as the pick-up device carried by the arm of a disc phonograph player. The transducer is preferably ceramic or crystal.

The pick-up unit 30 is identical to the pick-up unit 40, having an associated stylus (not shown) that is in contact with the transverse frame member 13.

Turning now to FIG. 3, the details of the main circuit 25 will be described. The main circuit 25 includes an active filter 50 which includes an operational amplifier ("op amp") 51 having a bias input connected by a resistor 52 to the B+ supply voltage. The output of the op amp 51 is coupled to its signal input through series feedback resistors 53 and 54. A capacitor 55 and a resistor 56 are coupled in series between the junction of the resistors 53 and 54 and ground. The elements 50-54 constitute a high-pass, active filter which prevents undesired, low-frequency signals from passing therethrough. The vibrations created in the wheel when the hubcap is being removed are of high frequency (several thousand Hz.). On the other hand, vibrations of the wheel during normal use are of low frequency. The filter 50 prevents these low-frequency vibrations from being reflected in the output thereof. The filter 50 will produce a filter signal in the presence of the high-frequency electrical signal resulting from removal of a hubcap. In a specific embodiment, the active filter 50 passed signals with a frequency greater than one KHz and rejected those below that frequency.

Electrical signals from the transducer 35 are coupled by wires 32 through a coupling circuit comprising a capacitor 60 and a resistor 61 to the signal input of the op amp 51. Electrical signals produced by the transducer 45 are coupled by wires 42, through a capacitor 62 and a resistor 63 also to the signal input of the op amp 51. Thus, electrical signals generated by the pick-up units 30 or 40 when a hubcap(s) is being removed will be applied to the active filter 50. Because the frequency will be greater than the cutoff frequency of that filter, a filter signal will be produced in the output.

The filter signal is applied to a comparator 70 which includes an op amp 71 having its bias input coupled through a potentiometer 72 to the B+ supply voltage and its signal input coupled by way of a resistor 73 to the active filter 50. The output of the op amp 71 is coupled through a diode 74 to a capacitor 75 connected to ground. Upon the occurrence of a filter signal, the amplitude of which is greater than the threshold established by the setting of the potentiometer 72, the output of the op amp 71 becomes high which rapidly charges the capacitor 75 through the diode 74. When the filter signal ends because the screeching noise produced during removal of the hubcap ends, the output of the op amp 71 returns to its normally low state. The capacitor 75 begins to discharge through a resistor 76. The circuit 25 includes an amplifier 80 comprising an op amp 81 having a feedback resistor 82, the bias input of the op amp 81 being coupled to the B+ supply voltage through a resistor 83. The op amp 81 is coupled by way of a resistor 84 to an electronic switch 85 in the form of a PNP transistor. The emitter of the PNP transistor is connected to ground. A relay 90 has a winding 91 and a pair of normally open contacts 92. The B+ supply voltage is coupled through a resistor 93, through the winding 91 to the collector of the transistor 85. A decoupling capacitor 94 to ground is also provided.

When the hubcap is removed, the filter signal is created, causing the amplifier 80 to produce a signal that renders the transistor 85 conductive, thereby energizing the relay 90 and closing the contacts 92. The capacitor 75 discharges through the resistor 76 when the screeching noise produced during hubcap removal ends, so that the electronic switch 85 stays in its conducting state for a predetermined duration thereafter. That duration is determined by the values of the capacitor 75 and the resistor 76. In one example, the capacitor had a value of 0.047 microfarad and the resistor had a value of 220 K ohms, producing a duration of about 10 milliseconds. This gives sufficient time for the contacts 92 to close and the alarm generator 27 to produce an alarm.

Very high-frequency signals such as are created by a CB radio or the ignition system will not be capable of charging the capacitor 75 to the point of enabling the op amp 81. Thus, the main circuit 25 has protection against falsing by high-frequency extraneous signals, as well as by low-frequency signals.

The winding 91 has the usual protection diode 95 coupled thereacross. An LED 96 and a resistor 97 are coupled in series across the widing 91. When the electronic switch 85 is conducting, current is also coupled through the LED 96 to illuminate the same. Thus, whenever an alarm is being generated, the LED 96 is illuminated. To set the sensitivity of the circuit 25, the potentiometer 72 is adjusted so that the LED 96 is on continuously. The potentiometer 72 is then readjusted so that it provides a lower threshold on the bias input of the op amp 71. The lower the threshold, the lower the sensitivity because electrical signals from the transducers 35 and 45 of greater amplitude are necessary.

The main circuit 25 also includes a safety circuit 100 which includes an op amp 101 having its bias input coupled to the B+ supply voltage through a resistor 102. Resistors 103 and 104 are respectively coupled to the B+ supply voltage and the signal input of the op amp 101, and respectively to a pair of terminals to which the wires 33 and 43 are connected in series. The output of the op amp 101 is coupled through a resistor 105 to the electronic switch 85. The output of the op amp 101 is normally low which requires both of its inputs to be high. If either of the wires 33 or 43 is cut, the signal input to the op amp 101 floats and its output becomes high, thereby rendering the electronic switch 85 conductive to set off the alarm. Thus, if a would-be thief cuts the cable 31 or the cable 41 he will necessarily cut the wires 33 or 43 causing an alarm to be generated.

Of course, each of the op amps 51, 71, 81 and 101 has B+ and ground terminals which are connected to the battery 29.

What has been described therefore is an improved vehicle alarm system to sound an alarm when a predetermined part(s) of the vehicle such as a hubcap or wheel cover is being removed, which utilizes a pick-up unit much like a phonograph pick up to sense the high frequency vibrations created during such removal.

I claim:

1. A vehicle alarm system for providing an operating signal to operate an alarm generator when a predetermined part of the vehicle is being removed, said vehicle alarm system comprising pick-up means for converting mechanical vibrations into an electrical signal at frequencies corresponding to the frequencies of the mechanical vibrations, means for attaching said pick-up means to a portion of the vehicle which is mechanically coupled to the predetermined part, filter means coupled to said pick-up means to provide a filter signal only in the presence of an electrical signal with frequencies exceeding a predetermined frequency, comparator means coupled to said filter means and being responsive to a filter signal exceeding a predetermined amplitude to provide a comparator signal, and circuit means coupled to said comparator means and being responsive to the comparator signal to provide an operating signal to operate the alarm generator.

2. The vehicle alarm system of claim 1 wherein said predetermined frequency is about one KHz.

3. The vehicle alarm system of claim 1, wherein said comparator means includes an op amp with a signal input coupled to said filter means and a bias input coupled to receive an adjustable threshold voltage.

4. The vehicle alarm system of claim 3, wherein said comparator means includes storage means coupled to the output of said op amp for retaining said comparator signal a predetermined time after termination of the vibrations.

5. The vehicle alarm system of claim 1, and further comprising electronic switch means coupled to said comparator means and being conductive in the presence of the comparator signal and nonconductive in the absence thereof, and mechanical switching means coupled to said electronic switching means and being closed when said electronic switching means is conductive, the alarm generator being coupled to said mechanical switching means.

6. The vehicle alarm system of claim 5, and further comprising an op amp having a first input coupled to a reference voltage and a second input coupled to said first wire means and an output coupled to said electronic switching means, said comparator means being in condition to operate said electronic switching means when said first wire means is open, second wire means for connecting said pick-up means to said filter means and being in cable relationship with said first wire means.

* * * * *